United States Patent [19]

Goldstein et al.

[11] Patent Number: 4,982,187

[45] Date of Patent: Jan. 1, 1991

[54] LOW-END HIGH-PERFORMANCE SWITCH SUBSYSTEM ARCHITECTURE

[75] Inventors: Barry C. Goldstein, Chappaqua; Hanafy El Sayed Meleis, Yorktown Heights; Asser N. Tantawi, Mahopac; Dominick A. Zumbo, White Plains, all of N.Y.

[73] Assignee: International Business Machines Corporation, Armonk, N.Y.

[21] Appl. No.: 442,286

[22] Filed: Nov. 28, 1989

[51] Int. Cl.$^5$ .................... H04Q 11/04; G06F 3/00
[52] U.S. Cl. .................... 340/825.79; 364/200; 364/900
[58] Field of Search ............ 370/58.2, 61, 29, 85.1; 340/826, 827, 825.79; 379/292, 280, 256; 364/200 MS File, 900 MS File

[56] References Cited

U.S. PATENT DOCUMENTS

| | | | |
|---|---|---|---|
| 4,209,840 | 6/1980 | Berardi et al. | 364/200 |
| 4,630,045 | 12/1986 | Georgiu | 340/825.79 |
| 4,845,722 | 7/1989 | Kent et al. | 370/58.2 |
| 4,887,076 | 12/1989 | Kent et al. | 340/826 |

Primary Examiner—Donald J. Yusko
Assistant Examiner—John E. Glust
Attorney, Agent, or Firm—Whitham & Marhoefer

[57] ABSTRACT

An architecture for a low-end, high-performance switch subsystem allows the connection of a multitude of requests per link. The switch subsystem operates a cross-bar switch under the control of a controller, such as a personal computer, to connect selected ones of a plurality of input links to selected ones of a plurality of output links. A data structure for the switch subsystem is mapped to the memory of the controller. The switch subsystem comprises three switch servers, a request server, a connect server, and an acknowledge server, which perform in a pipelined fashion. An interface protocol for the switching subsystem may be adapted to various applications and allows a connect request to be either queued in the switch subsystem until the requested output link in available or the requestor is notified immediately if the requested output link is not available, so that alternate actions can be taken.

12 Claims, 10 Drawing Sheets

LOW-END HIGH-PERFORMANCE SWITCH SUBSYSTEM ARCHITECTURE

BACKGROUND OF THE INVENTION

1. Field of the Invention

The present invention generally relates to switching systems and, more particularly, to a parallel architecture of a switch subsystem which handles a multitude of requests per link, performs connect service in parallel, and uses a cross-bar switch.

2. Description of the Prior Art

Computer systems are comprised of a number of units such as processing units, memory modules, and controller units for communications, displays, and storage devices. These units function independently but do exchange data from time to time and sometimes quite frequently. A simple and direct way for connecting these units, and thus providing a vehicle for data transfer, is through a bus. For small systems, a single bus is a cost-effective way of connecting the various units of the system. Larger systems with more than just a few units or with high bandwidth requirements need a non-blocking connection subsystem which provides minimal contention and thus yields high performance. An example of such a system is a switch subsystem utilizing a cross-bar switch. A complete switch subsystem would, in addition to the cross-bar switch, include switch servers and a data structure which control the operation of the switch and implement an interface protocol to the switch subsystem.

An example of the type of switch subsystem described is disclosed in U.S. Pat. No. 4,630,045 to C. Georgiou. Georgiou describes a high-performance controller for a cross-bar switch particularly adapted for use in multi-processor computer applications. The controller has a parallel/pipeline architecture that allows one step of a first request to be serviced simultaneously with another step of a second request with several sub-steps of a step to be performed concurrently. The Georgiou switch subsystem performs well in large computer system installations, but its cost is too high for low end applications.

What is needed is a switching subsystem which provides good performance while being relatively inexpensive so that this type of switching capability can be made available to low-end computer systems.

SUMMARY OF THE INVENTION

It is therefore an object of the present invention to provide an architecture for a low-end, high-performance switch subsystem that allows the connection of a multitude of requests per link, thus reducing the overhead associated with actually making the connection.

It is another object of the invention to provide a switch subsystem having an architecture that allows switch servers such as a request server, a connect server, and an acknowledge server to perform in a pipelined fashion and thus achieve high bandwidth.

It is a further object of the invention to provide an interface protocol for a switching subsystem which may be adapted to various applications and allows a connect request to be either queued in the switch subsystem until the requested output link is available or the requestor to be notified immediately if the requested output link is not available, so that alternate actions can be taken.

According to the invention, there is provided a low-end, high-performance switch subsystem which includes a request server, a connect server and an acknowledge server operating in pipelined fashion to control a commercially available cross-bar switch. A flexible protocol is provided for controlling the actions of the several servers depending on the type of connection request received and the current status of the switch.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
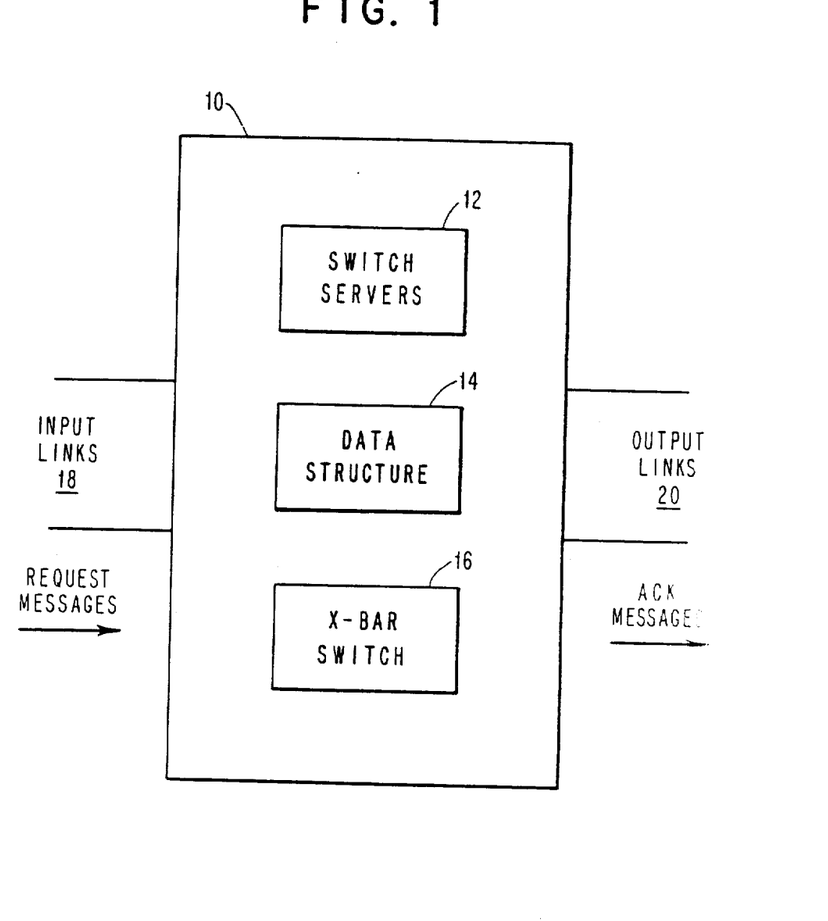
FIG. 1 is a high level block diagrax showing the system architecture of the switch subsystem according to the present invention.

Referring now to the drawings, and more particularly to FIG. 1, there is shown in block diagram form the generalized architecture of the switch subsystem according to the invention. The switch subsystem 10 comprises a plurality of switch servers 12, a data structure 14, and a cross-bar switch 16. Logically, the switch servers 12 consult the data structure 14 in order to use the cross-bar switch 16. In addition, there is a set of input links 18 and a set of output links 20. The interface to the switch subsystem is defined by a set of request messages and a set of acknowledge (ACK) messages. A request message from an input link to the switch subsystem is a request to establish or disconnect a circuit from this input link to one or more output links. The switch subsystem responds to these request messages by sending ACK messages giving the status of the request.

The interface protocol is designed so that an efficient higher level protocol can be implemented in order to accommodate various applications. A main feature of the interface protocol is that a connect request can be either queued in the switch subsystem until the requested output link is available or the requestor is notified immediately if the requested output link is not available, so that alternate actions can be taken. Also, the interface protocol allows a request to address one or more output links. A request message to the switch subsystem has the format illustrated in FIG. 2 and comprises two parts, a message type and the output links requested.

Figure 2:
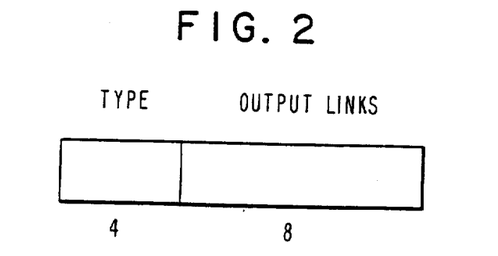
FIG. 2 is a diagram showing the data format of a request message.

As shown in FIG. 2, the message type is four bits wide permitting up to sixteen message types to be defined; however, for the preferred embodiment of the invention, there are only three types of messages as given below:

RC1 (0001)—Request to connect with queuing.
RC2 (0010)—Request to connect without
RD1 (0011)—Request to disconnect.

The first two requests, RC1 and RC2, are requests to make connections to the output links given in the request message. The switch response to RC1 and RC2 requests differs only when a requested output link is not available. In such a case, an RC1 request is queued in the switch subsystem until the required output link is available, whereas an RC2 request is not queued but rather the switch subsystem replies to the input link that the requested output link is not available. In case a subset of the output links in an RC2 message is available, the switch subsystem connects that subset. The third type of request, RD1, is simply a request to disconnect the output link given in the request message.

For purposes of this description, an $8 \times 8$ cross-bar switch is assumed. The hardware structure of the switch subsystem may be implemented using the Texas Instruments (TI) digital cross-bar switch SN74AS8841. It will be understood, however, that this is but one implementation, and those skilled in the art will recognize that the teachings of the invention may be generally applied to switching subsystems of the type described. As shown in FIG. 2, the output links field has a width which is dependent on the size of the switch. Thus, for an $8 \times 8$ switch, the output links field of a request message is eight bits wide, one bit per output link. An active bit in the $i^{th}$, $i = 1, 2, \ldots, 8$, position in the output links field signifies the fact that the $i^{th}$ output link is addressed by the request. This format of request messages allows an input link to request the connection or disconnection of a multitude of output links, hence providing a broadcast capability to some or all output links.

Figure 3:
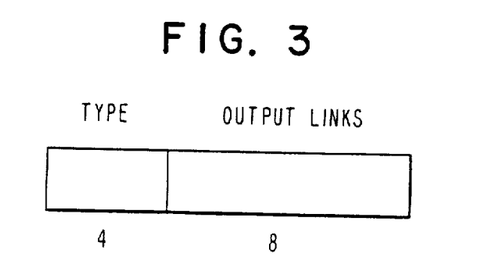
FIG. 3 is a diagram showing the data format of an acknowledge message.

An ACK message is a message which the switch subsystem sends in response to a request message from an input link. The format of an ACK message is similar to that of a request message as shown in FIG. 3. There are six types of ACK messages, three corresponding to the three connect requests and three corresponding to disconnect messages The six types of ACK messages are given below:

AC1 (0001)—Connect completed.
AC2 (0010)—Duplication of a connect request.
AC3 (0011)—Output link not available.
AD1 (0100)—Disconnect completed.
AD2 (0101)—Attempt to disconnect a disconnected circuit.
AD3 (0110)—Attempt to disconnect an outstanding connect request.

The first three messages are responses to connect requests. An AC1 message is an acknowledgement that the links given in the output links field of the request message are now available for the requesting input link to use. An AC2 message is a response to a connect request message which is a duplicate of a previous connect request from the same input link that is either outstanding in the switch subsystem or already connected. An AC3 message is a response to an RC2 connect request notifying the requesting link that the links given in the output links field are already connected. The last three ACK messages correspond to disconnect requests. An AD1 message is an acknowledgement that the output links given in the message are now disconnected. An input link which attempts to disconnect a circuit that is not connected receives an AD2 message from the switch subsystem. Finally, an AD3 message is a response to an input link which attempts to disconnect an output link whose connect request is still outstanding in the switch subsystem.

Figure 4:
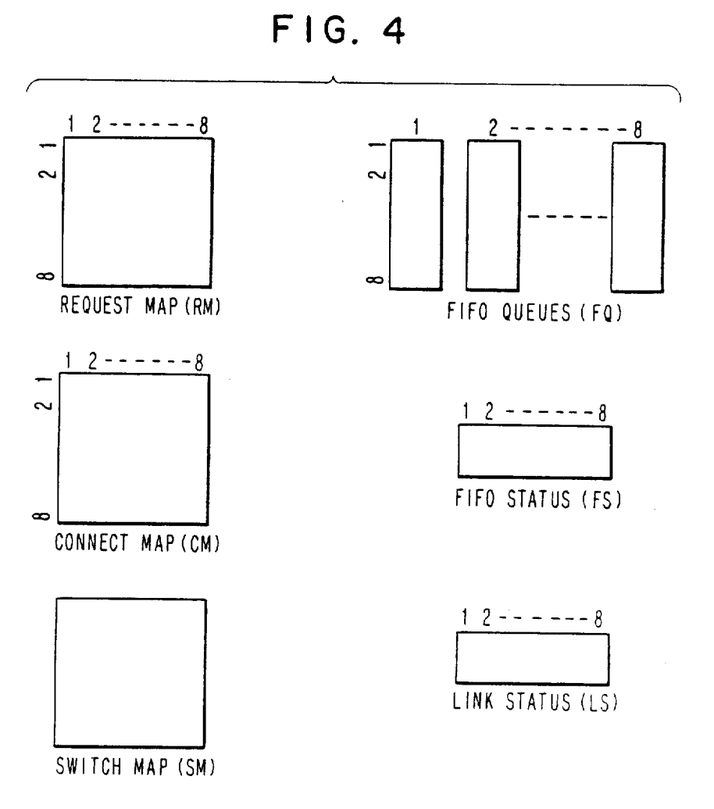
FIG. 4 is a block diagram illustrating the data structure of the protocol used in the subject invention.

A set of data structures giving the status of requests in the switch subsystem and the status of the output links is consulted and manipulated by the switch servers This data structure comprises the data objects shown in FIG. 4 and described below.

The Request Map (RM) is an $8 \times 8$ matrix with rows and columns representing input links and output links, respectively A "1" in the (ij)$^{th}$ entry means that a request to connect input link i to output link j is either waiting for the connection to be established or has already been satisfied; i.e., the circuit is connected. On the other hand, a "0" entry reflects the fact that input link i is not connected to output link j and that there are no requests pending for that circuit.

The Connect Map (CM) is also an $8 \times 8$ matrix; however, CM is a subset of RM, so that a "1" in the (ij)$^{th}$ entry in CM means that input link i is connected (or will be connected the next time the cross-bar switch is loaded) to output link j.

The Switch Map (SM) is generated from CM and loaded into the cross-bar switch in order to achieve the connect pattern given by CM.

A set of first-in, first-out (FIFO) registers, one per output link, forms the FIFO queues (FQ). A connect request is queued in the appropriate FIFO queue until the requested output link is available. Each FIFO queue has a maximum length of eight entries where each entry holds the address of the requesting input link.

The FIFO Status (FS) is an 8-bit vector giving the status of the eight FIFO queues. An entry of "1" in the FS means that the corresponding FIFO queue holds one or more requests. On the other hand, a "0" means that the queue is empty.

Finally, the Link Status (LS) is an 8-bit vector, one bit per output link. LS gives the actual status of the output links whether they are currently connected or not.

Figure 5A:
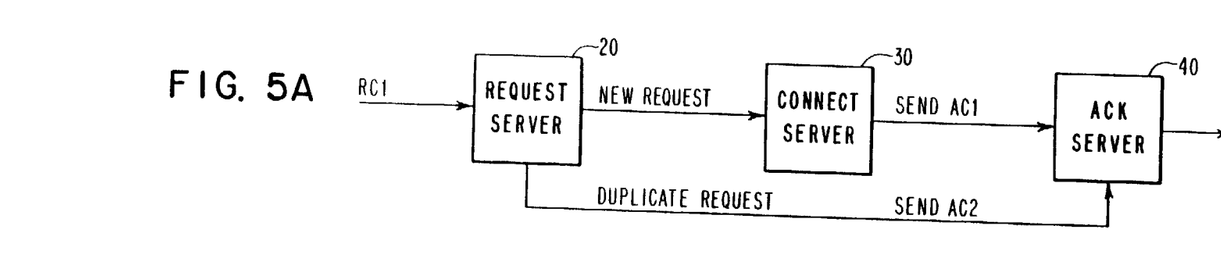
FIGS. 5A, 5B and 5C are block diagrams illustrating the logical flow between the serveral servers for three different types of request messages.
Figure 5B:
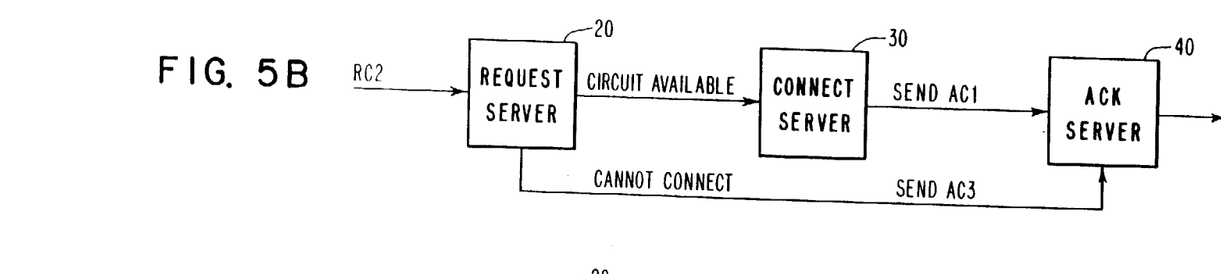
Figure 5C:
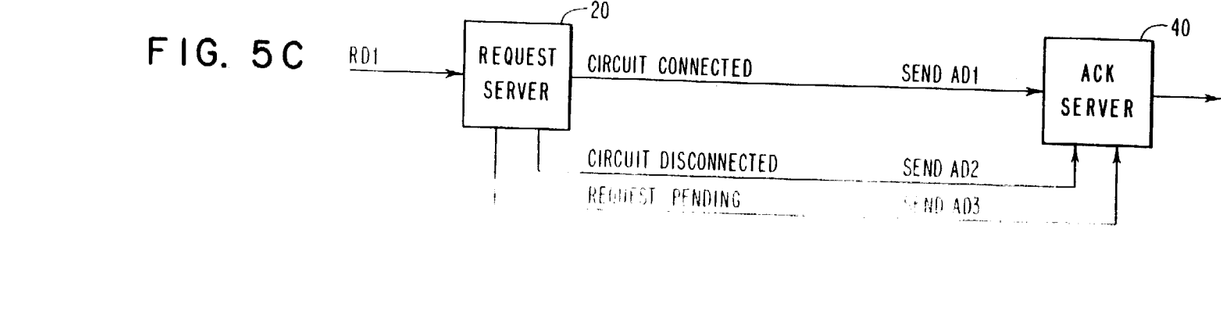

There are three switch servers which function in a pipelined fashion, as generally illustrated in FIGS. 5A, 5B and 5C. These are the request server 20, the connect server 30 and the ACK server 40. The request server 20 processes request messages by either delivering the messages to the connect server 30, in case connections are possible, or generating the appropriate ACK messages. The connect server 30 manipulates the queues of requests, makes the connections, and generates ACK messages when the connections are completed. The ACK server 40 sends ACK messages received from either the request server 20 or the connect server 30 in response to request messages. An illustration of the logical flow of the various types of request messages within the switch subsystem is given in FIGS. 5A, 5B and 5C. In each of these figures, the request server 20 loops around the input links until a message is detected. Depending on the type of request message detected, the request server 20 then communicates with the connect server 30 and the ACK server 40.

With reference to FIG. 5A, an RC1 message is detected and the following actions are taken:

RC1 request
Check RM and CM
If request is not in RM (new request), then prepare for connection by updating RM and FS and putting request in FQ
If request is in RM and CM (already connected), then send AC1 message
If request is in RM but not in CM (pending request), then send AC2 message In FIG. 5B, an RC2 message is detected and the following actions are taken:

RC2 request
Check RM
If request is not in RM (connection possible), then prepare for connection by updating RM and FS and putting request in FQ
If request is in RM (pending or connected), then send AC3 message In FIG. 5C, an RD1 message is detected and the following actions are taken:

RD1 request
Check RM and CM
If request is not in RM (already disconnected), the send AD1 message
If request is in RM but not in CM (pending request), then send AD3 message request is in RM and CM (circuit connected), then disconnect by updating RM, CM and LS and sending AD1 message The connect server 30 checks if the connections are possible by examining FS and LS. In case one or more connections are possible, the connect server performs the following steps:

Update CM and LS and generate SM
For every connection possible, remove request from FQ, update FS and generate
AC1 message
Load the switch map (SM)
Send generated ACK messages to the ACK server 40

Figure 6:
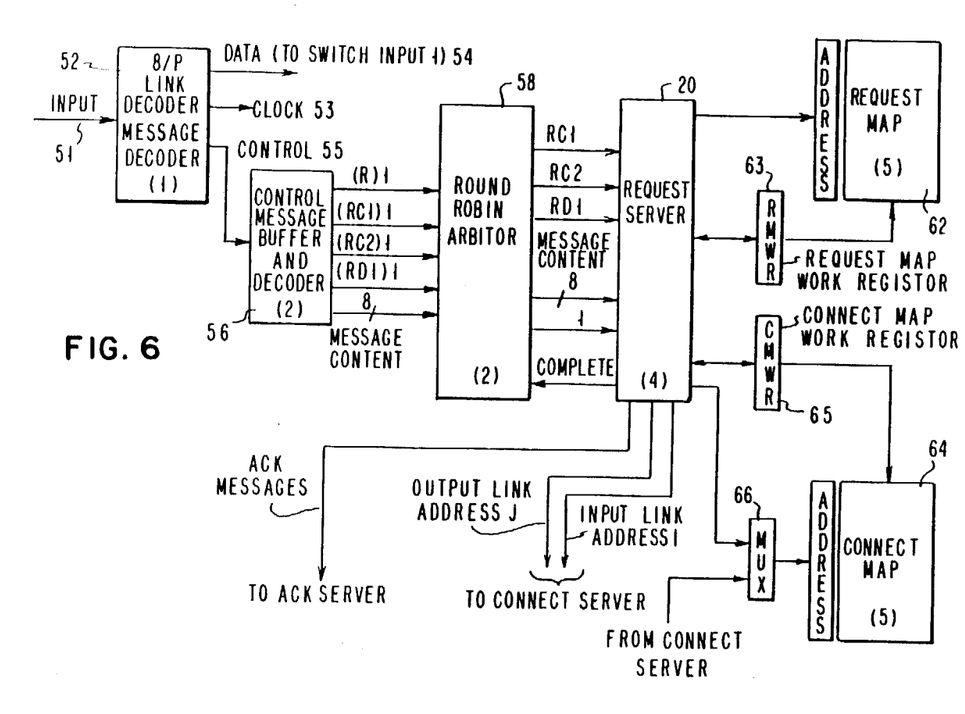
FIG. 6 is a block diagram showing in more detail the structure of the request server.

FIG. 6 shows a block diagram of the hardware needed to process the data of the link and provide an interface to the request server. For purposes of this description, the TI digital cross-bar switch SN74AS8841 is assumed. Each link is a serial link containing coded data, for example 4B/5B code or 8/10 code. Links may be optical or electrical. In the case of an optical link, an optical receiver transforms the optical signal to an electrical signal.

With reference to FIG. 6, a link and message decoder 52 performs decoding, serial to parallel conversion and message demultiplexing functions. There are two types of messages; one is a control message which contains the interface protocol, and the other is a data message which contains the data that goes through the switch after connecting the circuit. The input 51 to link and message decoder 52 is a serially coded data stream, and the outputs are a clock 53 (recovered from the data), a data bus 54 and a control bus 55. Control messages appear on the control bus 55, and the data appears on the data bus 54. The link and message decoder 52 may be implemented using an Advanced Micro Devices AMD 7969 integrated circuit (IC).

The control messages are interfaced to the request server 20. After the request is granted and the connection is established, the data flows from the data bus 54 to the switch link, and the switch card then appears as a direct connection between the input link and the corresponding output link.

The control messages on bus 55 are buffered and decoded for each link in control message buffer and decoder 56. The outputs of control message buffer and decoder 56 are five signals. The first, or "R" signal, identifies if a link needs to be served. If this output is active, then the connect server 30 (shown in more detail in FIG. 7) will process the request according to its type. As a result of decoding the control message, one of three outputs are generated to the request server 20; RC1, RC2 or RD1, as described above. The fifth output is an 8-bit bus which contains the control message data of the link request.

The links are served in round robin fashion. As mentioned, an active "R" bit on the first output of message buffer and decoder 56 indicates that the link needs service. The round robin arbiter 58 passes the decoded control message to the request server 20, if the request server is available. This is indicated by the request server 20 when the "complete" signal is active. The data passed to the request server 20 from the arbiter 58 contains the following information: RC1, RC2 or RD1, message content (eight bits) and the physical link address "i". After receiving these signals, the request server will proceed in the following fashion. First, based on the link address, it will read the corresponding location in the request map 62. This map is, for our example, an 8×8 memory within which each row address contains the connection information for which "i" input link is connected to which "j" output link. This data is latched to a register called "Request Map Working" register 63. Secondly, the request server 20 will read the identical row address location in the connect map 64 when a read cycle is granted by the arbiter 58. This data is latched to a register called "Connect Map Working" register 65. The connect map 64 can be accessed by both the request server 20 and the connection server 30 (FIG. 7) via a multiplexer 66. Access cycles for the connect map 64 are granted by the connect server 30 after each connection cycle. Depending on which signal RC1, RC2 or RD1 is active, the action that is taken is summarized in FIGS. 5A, 5B or 5C, respectively. If the action is to send an ACK message, it will be placed in the FIFO that is controlled by the ACK message server 40 (shown in more detail in FIG. 8). The information sent to the connect server 30 (FIG. 7) is the FIFO address which corresponds to the output link address "j" and the input link address "i".

Figure 7:
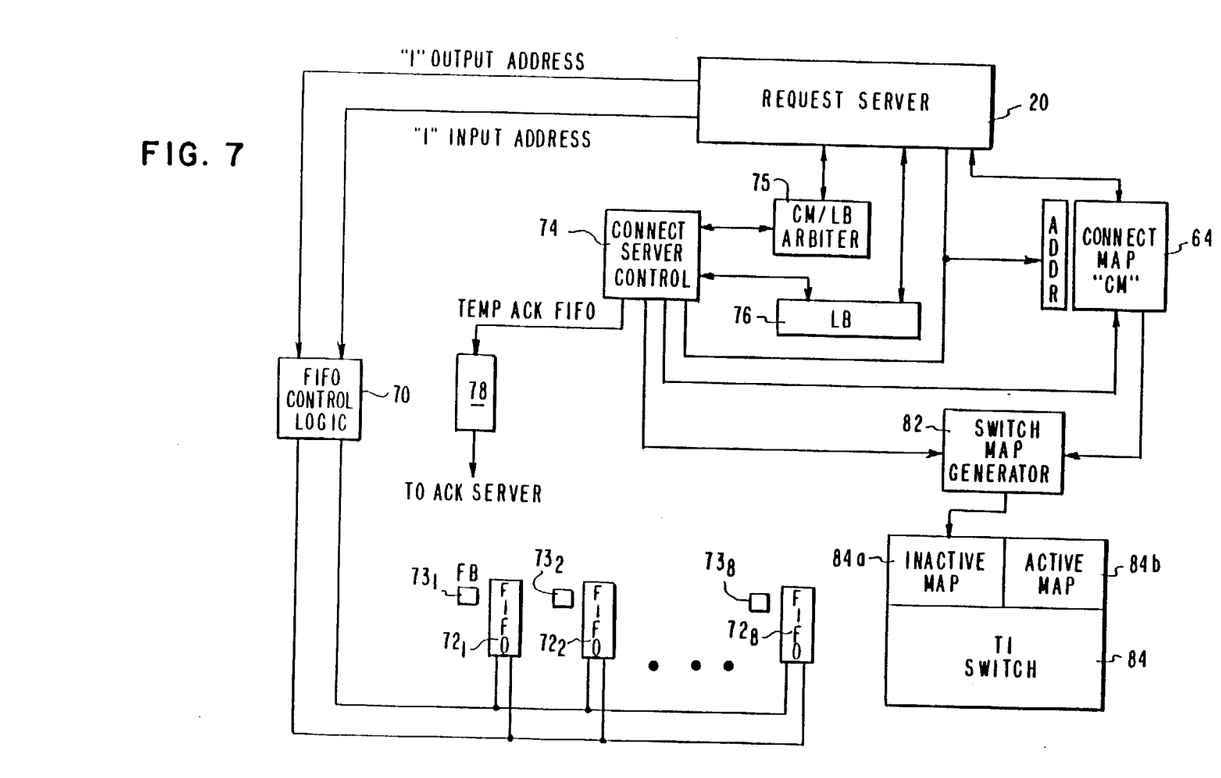
FIG. 7 is a block diagram showing in more detail the structure of the connect server.

The connect server 30 is shown in FIG. 7. The inputs "i" and "j" from the request server 20 are processed by the FIFO control logic 70 which then uses this information to enable the appropriate FIFO register $72_1$, $72_2$, . . ., $72_8$ and place into it which input link is to be connected to that output link. The status for the eight output FIFO registers is kept by the bits in the FIFO status (FS) register, composed of stages $73_1$, $73_2$, . . ., $73_8$, which is updated whenever data is placed into one of the FIFO registers. Since both the request server 20 and the connect server access the connect map 64, an abriter 75 is provided between the two servers. Requests for access to the connect map 64 are made to the arbiter by the request server 20 and the connect server control 74, and the arbiter 75 grants the requests on a priority basis.

The connect server control logic 74 starts a connection cycle as follows. First, it checks the link status register 76 from the least significant output bit to the most significant output bit to determine which output links are available. The first available output link that the connect server finds is serviced by going to the FIFO register which corresponds to the bit found in the link status register 76. The connect server then uses the address contained in the FIFO register and the address of the FIFO register itself to update the connect map 64. It sequentially proceeds to check the other bits of the link status register 76 to determine which links are available for connection. During the process of making each connection, the connect server control logic 74 creates an ACK message for the requesting link and stores it in the temporary ACK FIFO register 78. After the connection sequence, the control server starts the switch map generator 82. The switch map generator configuration is a function of the cross-bar switch that is used. The TI switch 84 has two maps 84a and 84b. One can be used as the active map of connectivity and the other as an inactive map. After loading the switch map, the connect server control logic 74 interchanges the inactive and active maps via the control lines of the switch. After the new switch map is loaded, the connection cycle is completed and the control server sends the contents of the temporary ACK FIFO register 78 to the ACK server 40.

Figure 8:
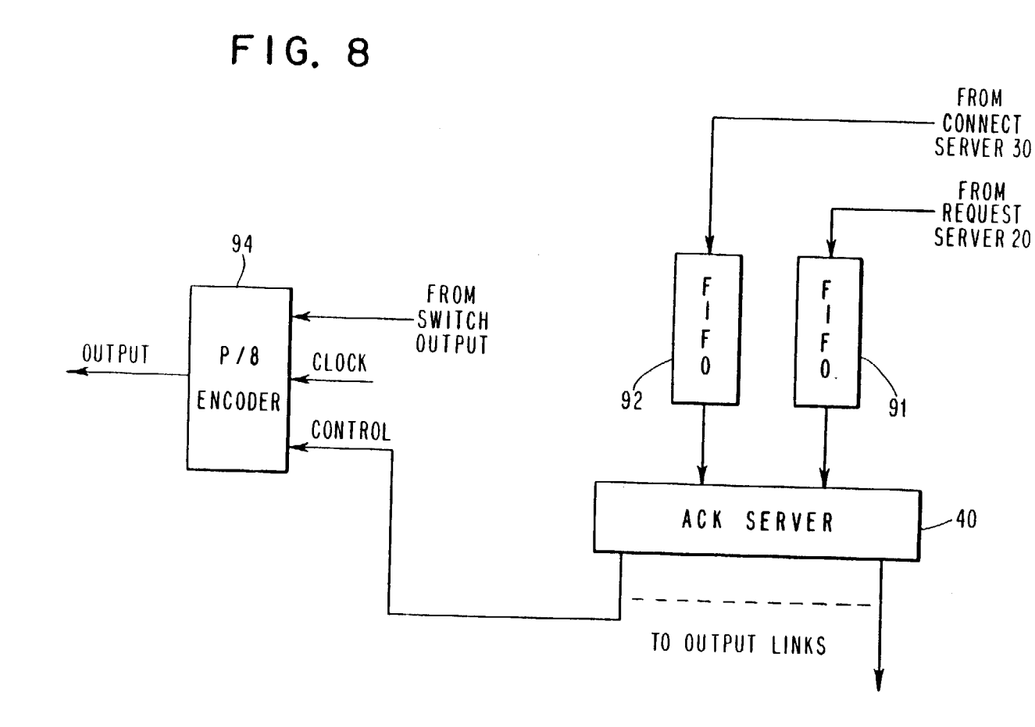
FIG. 8 is a block diagram showing in more detail the structure of the acknowledge server.

The ACK server 40 and the output link interface are shown in FIG. 8. There are two input FIFO registers 91 and 92 to the ACK server 40, one from the request server 20 and another from the connect server 30. The ACK server FIFO registers contain the ACK message and the output link address. This information is sent by the ACK server 40 to the corresponding output link. The output link interface comprises a parallel to serial converter and an encoder 94. The input of the converter/coder 94 is the reverse of that which was described previously for the link and message decoder 52 in of FIG. 6. The converter/coder 94 may be implemented with an Advanced Micro Devices AMD 7968 IC.

Figure 9:
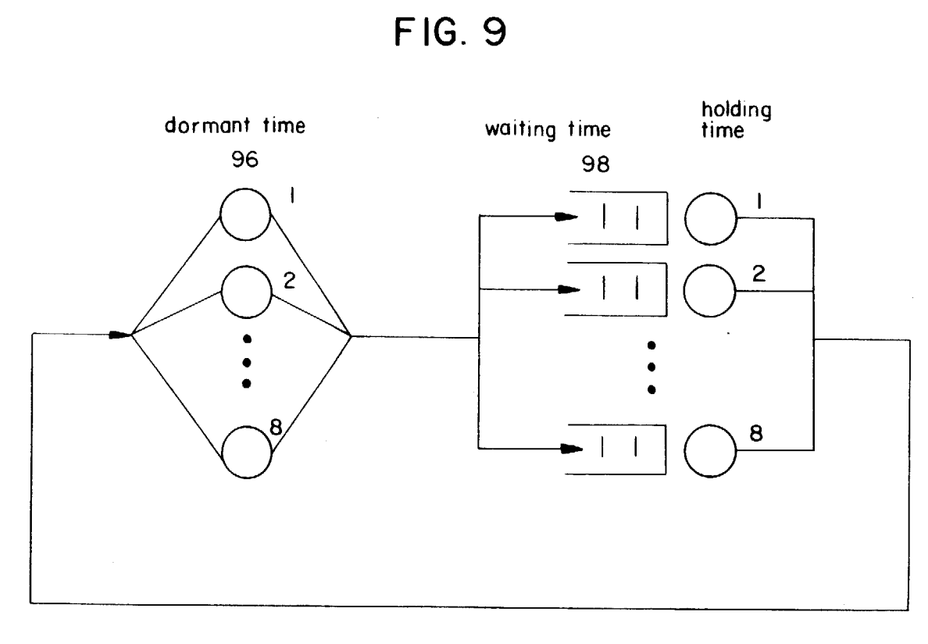
FIG. 9 is a block diagram of a queuing network model used to evaluate the performance of the switching subsystem according to the invention.

The switch subsystem is modeled by a closed queuing network as shown in FIG. 9. The network comprises an infinite server queue 96 representing the delay at the input link until the generation of the next connect request and eight first-come-first-served (FCFS) queues 98, each models a FIFO queue in the switch subsystem. The flow of a connect request in the queuing network is traced as follows. The request arrives at one of the FCFS queues depending on the required output link. For simplicity, we assume that only one output link is requested at a given time. Furthermore, we assume that the traffic is uniform; i.e., each output link is equally likely to be addressed by a request. After waiting in the queue and receiving service; i.e., using the output link, the requesting input link takes some time in order to generate the next connect request. We refer to this time as dormant time. We assume that the effect of actually making the connection and disconnection is negligible compared to the circuit holding time. More specifically, we consider the transfer of data of an average length of 4 Kbytes at a rate of 80 Mbits/sec yielding a holding time of approximately 400 $\mu$sec. The time to make a connection in the switch is roughly two orders of magnitude less than the holding time, and thus its impact can be safely neglected. Assuming exponentially distributed dormant time and holding time, the queuing network becomes a product-form queuing network and hence is straight forward to analyze. See, for example, S. S. Lavenberg, Ed., *Computer Performance Modeling Handbook*, Academic Press (1983).

Figure 10:
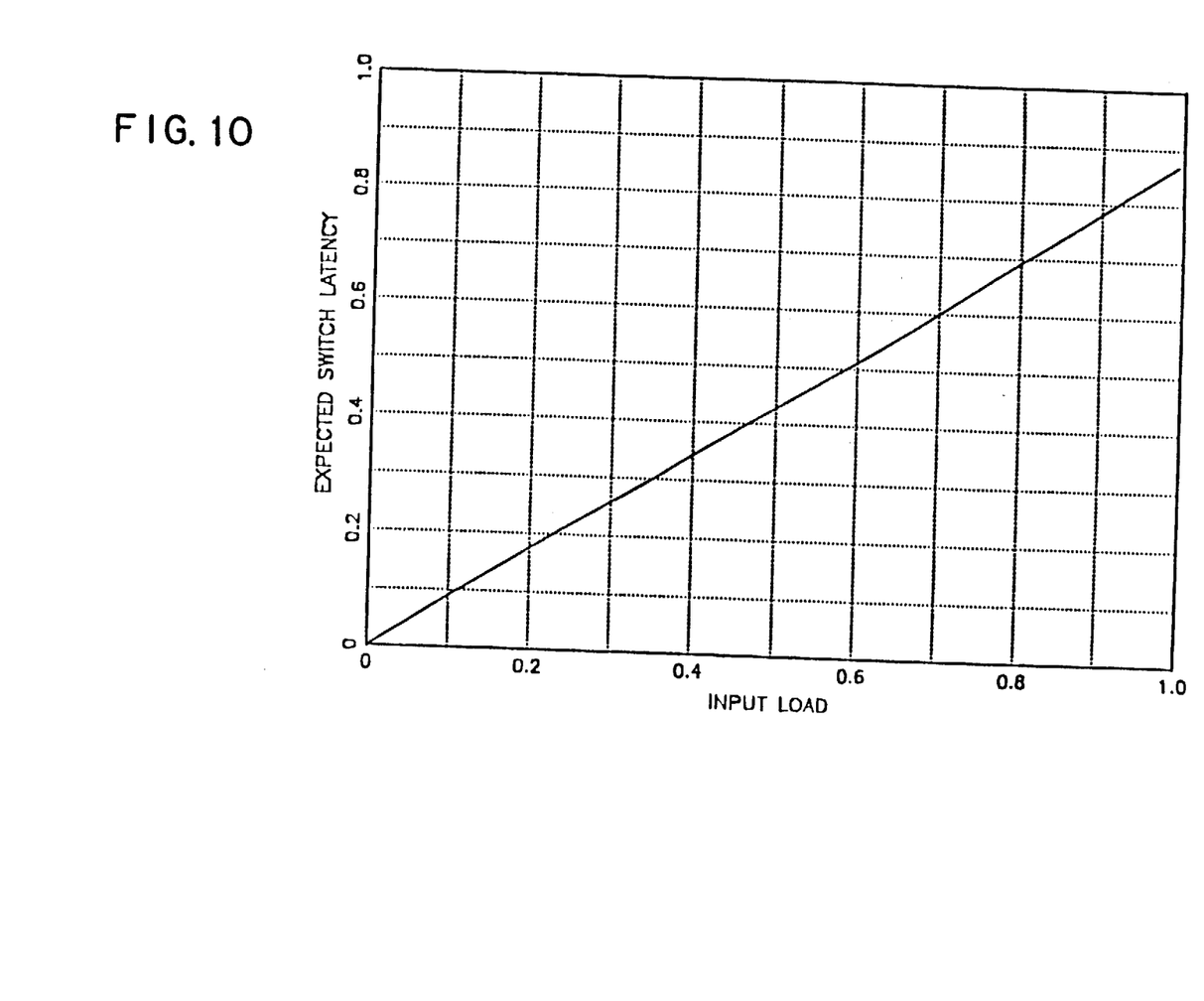
FIG. 10 is a graph showing the switching subsystem performance based on the queuing network model of FIG. 9.

Using the mean holding time as the unit of time, we plot in FIG. 10 the mean switch latency time, i.e., the time a request has to wait in the queue until it starts using a circuit, as a function of the input load on the link. An input load of one means that the dormant time shrinks to zero; i.e., the input link is overloaded. From FIG. 10, we note an almost linear relationship. If all input links are overloaded, a request finds on the average 7/8 requests in the queue, and thus its average waiting time is 0.875. Note that the maximum delay that a request can experience is seven since it cannot find more than seven requests waiting (and using) the same output link.

A specific example of an application of the switch subsystem will now be described. We consider a high bandwidth connectivity subsystem controller with eight input/output links. In such a controller, links might be attached to IBM S/370 channels (OEM2 or serial), private fiber drivers with the speed of multiple megabits per link, high speed local area networks (LANs), or T3 interface cards to a public network. Using our switch subsystem, we will show an architecture of a personal computer (PC) based controller for this connectivity subsystem. The preferred PC is one of IBM Corporation's Personal System 2 ™ (PS/2) series of personal computers which support a family of bus architectures.

Currently, the PS/2 computers have a bus with an effective bandwidth which depends on the specific bus architecture, the microprocessor type and speed, and the memory speed. There are basically three levels of the PS/2 bus; an 8-bit bus, a 16-bit bus and a 32-bit bus. The 16-bit bus runs at a rate of up to 5 Mbytes per second, while the 32-bit bus runs up to 10 Mbytes per second. The 32-bit architecture also supports a mode which is called "nibble mode" in which each PC card on the bus can be either a slave or a master and data can be transferred between two cards without going through the PC memory or generating an address using the microprocessor of the PC. In this mode, a transfer can be as fast as 80 Mbytes/sec. In each PC card, additional logic has to be implemented in order to support the generation of addresses for the slave card. The nibble mode of bus operation provides a high speed switching capability but it has two drawbacks. First, high speed logic and memory are needed in each card in order to be able to sustain the burst transfer at the 80 Mbyte data transfer rate. Secondly, the extension of the bus is not practical or reliable due to timing constraints on the bus. Accordingly, an extension has to have a lower speed bus using a bus-to-bus adapter. The controller design presented below does not depend on the bus speed and each card does not need logic or memory faster than the link speed of the switch (10 Mbytes/sec for the TI switch). The logical architecture of the controller is illustrated in FIG. 11.

Figure 11:
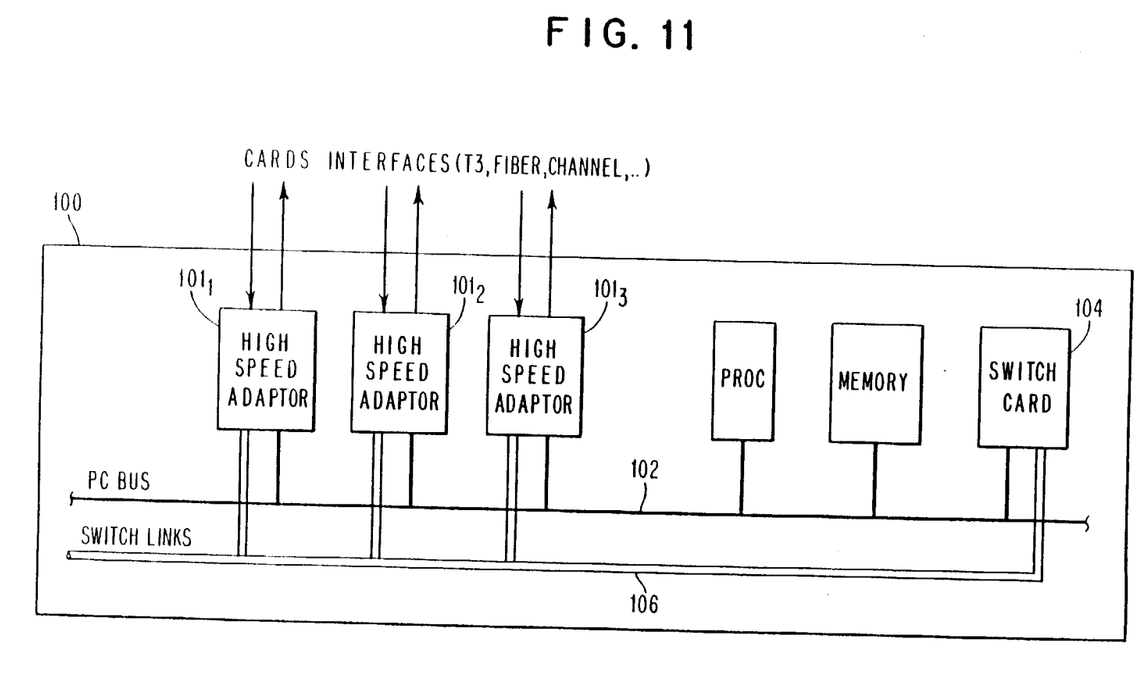
FIG. 11 is a block diagram showing an implementation of the switching subsystem in a personal computer.

As shown in FIG. 11, each adapter $101_1$, $101_2$, $101_3$ in the PC 100 (controller) is attached to the PC bus 102. In addition to the PC bus attachment, an output and input link from and to each adapter is connected to a PC switch card 104 containing the TI cross-bar switch. A back plane 106 of sixteen wires can be used to implement the links to and from the switch card 104. Note that the signals in this link are independent and are time independent. Each adapter $101_1$, $101_2$, $101_3$ comprises an attachment protocol (channel LAN, T3 or fiber driver), a memory bank, a microprocessor subsystem, a switch interface and a PC bus interface. Data transfer takes place through the switch and from one adapter to another. Network management takes place through the PC interface. In case of a link or switch failure, data transfer can take place over the PC bus 102 at a degraded performance until a repair is made.

We have presented an architecture for a low-end, high-performance switch subsystem which is based on a cross-bar switch. We have designed a simple interface protocol to the switch subsystem and described both the logical and hardware structures of the various switch servers. Furthermore, we have modeled the switch subsystem with a queuing network model and evaluated its expected performance. Then, as an amplification, we have used our switch subsystem to design a PC-based high bandwidth connectivity subsystex: controller. The main features of the switch subsystem are summarized below.

The switch subsystem can be implemented on a single PC board which has no processor but rather dedicated hardware providing high speed switching and handling at 80 Mbits/sec. link speeds. A portion of the data structure on the board can be memory-mapped to the main controller memory and therefore allowing easy-to-implement switching management schemes.

The switch subsystem consists of three servers; a request server, a connect server and an acknowledge server. The three servers function in a pipelined fashion and are able to handle and connect multiple requests at a time.

A single request from an input link may be directed to one or more (in our example, up to eight) output links. This allows the broadcasting of messages to a subset or all links. The connect server provides parallel service to all the requested output links in a connect request.

A first-come-first-serve queuing discipline per output link is adopted so that a fair use of the resources is achieved. However, a no-queuing option in the interface protocol allows an urgent connect request, which cannot be connected immediately, to go through another possible connection subsystem or cause an alternate action to be taken.

Finally, the maximum queuing delay in the switch is bounded above by seven times the maximum allowed holding time per requestor. This is due to the finite number of requestors and the FCF'S queuing discipline. This also implies that a minimum FIFO stack size of eight is needed.

While the invention has been described in terms of a single preferred embodiment based on a specific commercially available cross-bar switch, those skilled in the art will recognize that the invention can be practiced with modification within the spirit and scope of the appended claims.

Having thus described my invention, what I claim as new and desire to secure by Letters Patent is as follows:

1. A switch subsystem connected to a plurality of input links and a plurality of output links for operating a cross-bar switch under the control of a controller to connect selected ones of said input links to selected ones of said output links, said controller having a memory and a data structure for said switch subsystem being mapped to said memory, said switch subsystem comprising:

a request server connected to said plurality of input links and responsive to request messages for making connections to said plurality of output links, said request server checking a request map in said data structure to determine if a request is in said request map;

a connect server responsive to said request server and, when a request is not already in said request map, checking a link status vector in said data structure to determine if a connection is possible and, if so, checking a connect map in said data structure and generating a switch map in said data structure, said switch map being used to control said cross-bar switch; and an acknowledge server responsive to said request server and said connect server and generating an acknowledge message on one of said output links in depending on an action taken in response to a request message.

2. The switch subsystem recited in claim 1 further comprising:

a link decoder receiving serial data from a plurality of input links and separating said serial data onto a data bus or onto a control bus, said data bus being connected to said cross-bar switch;

a control message buffer and decoder connected to said control bus and generating outputs identifying a type of request and a links field specifying the links to be affected in said crossbar switch; and a round robin arbiter receiving the outputs of said control message buffer and supplying those outputs to said request server when said request server is available thereby servicing link requests in order.

3. The switch subsystem recited in claim 2 wherein said connect server includes FIFO control logic responsive to link addresses from said request server and queuing a link request in a FIFO register in said data structure corresponding to one of said output links and updating a FIFO status register also in said data structure to reflect a current status of said FIFO register, said connect server using the data contained in said FIFO register to update said connect map.

4. The switch subsystem recited in claim 3 implemented in a personal computer of the type having a bus to which are connected a processor and a memory, said switch subsystem including a switch card having thereon said request server, said connect server, said acknowledge server and said cross-bar switch, said switch card being connected to said bus, said switch subsystem further comprising:

a plurality of switch links paralleling said bus and connected to said switch card; and a plurality of high speed adapters connected to said bus and said switch links and providing an interface between said switch subsystem and a plurality of communication channels 5. A protocol for the operation of a switch subsystem connected to a plurality of input links and a plurality of output links for operating a cross-bar switch under the control of a controller to connect selected ones of said input links to selected ones of said output links, said controller having a memory and a data structure for said switch subsystem being mapped to said memory, said switch subsystem including a request server connected to said plurality of input links, a connect server responsive to said request server and an acknowledge server responsive to said request server and said connect server, said protocol comprising, in response to a request to connect with queuing, the steps of:

checking by the request server a request map and a connect map in said data structure and if the request is not in said request map indicating a new request, updating the request map, placing the request in one of a plurality of FIFO registers corresponding to said output links and updating a vector in said data structure representing the status of said FIFO registers;

checking by the connect server said vector and a link status register in said data structure which records the status of said output links to determine if one or more connections are possible and, if so, updating said link status register and a connect map in said data structure and generating a switch map in said data structure, loading said switch map in said cross-bar switch, removing a request corresponding to a connection made from its FIFO register and updating said vector, and generating a first acknowledge message indicating that the connection was completed; and sending by the acknowledge server said first acknowledge message.

6. The protocol recited in claim 5 further comprising the steps performed by the request server of:

if the request is in the request map and in the connect map, indicating that the connection has already been completed, then generating said first acknowledge message and sending it to said acknowledge server; but if the request is in the request map but not in the connect map, indicating a pending request, then generating a second acknowledge message indicating a duplicate request message and sending it to said acknowledge server.

7. The protocol recited in claim 5 further comprising the steps performed by the request server of:

checking the request map and the connect map in response to request to disconnect; and if the request is in the request map and the connect map, then making the disconnection by updating the request map, the connect map and the link status register, generating a third acknowledge message indicating that the disconnection is completed and sending it to said acknowledge server.

8. The protocol recited in claim 7 further comprising the steps performed by the request server in response to said request to disconnect of:

if there is a request to connect in the request map but not in the connect map, indicating a pending request, then generating a fourth acknowledge message indicating an attempt to disconnect an outstanding request to connect and sending it to the acknowledge server; but if there is no request in the request map, indicating that a circuit is already disconnected, then generating a fifth acknowledge message indicating an attempt to disconnect an already disconnected circuit and sending it to said acknowledge server.

9. A protocol for the operation of a switch subsystem connected to a plurality of input links and a plurality of output links for operating a cross-bar switch under the control of a controller to connect selected ones of said input links to selected ones of said output links, said controller having a memory and a data structure for said switch subsystem being mapped to said memory, said switch subsystem including a request server connected to said plurality of input links, a connect server responsive to said request server and an acknowledge server responsive to said request server and said connect server, said protocol comprising, in response to a request to connect without queuing, the steps of:

checking by the request server a request map in said data structure and if the request is not in said request map indicating a connection is possible, updating the request map, placing the request in one of a plurality of FIFO registers corresponding to said output links and updating a vector in said data structure representing the status of said FIFO registers;

checking by the connect server said vector and a link status register in said data structure which records the status of said output links to determine if one or more connections are possible and, if so, updating said link status register and a connect map in said data structure and generating a switch map in said data structure, loading said switch map in said cross-bar switch, removing a request corresponding to a connection made from its FIFO register and updating said vector, and generating a first acknowledge message indicating that the connection was completed; and sending by the acknowledge server said first acknowledge message.

10. The protocol recited in claim 9 further comprising the step performed by the request sever if the request is in the request map, indicating a pending or connected circuit connection, then generating a sixth acknowledge message indicating the output link is not available.

11. The protocol recited in claim 9 further comprising the steps performed by the request server of:

checking the request map and the connect map in response to request to disconnect; and if the request is in the request map and the connect map, then making the disconnection by updating the request map, the connect map and the link status register, generating a third acknowledge message indicating that the disconnection is completed and sending it to said acknowledge server.

12. The protocol recited in claim 11 further comprising the steps performed by the request server in response to said request to disconnect of:

if there is a request to connect in the request map but not in the connect map, indicating a pending request, then generating a fourth acknowledge message indicating an attempt to disconnect an outstanding request to connect and sending it to the acknowledge server; but if there is no request in the request map, indicating that a circuit is already disconnected, then generating a fifth acknowledge message indicating an attempt to disconnect an already disconnected circuit and sending it to said acknowledge server.

* * * * *